United States Patent [19]

Lindemeyer

[11] Patent Number: 4,464,948
[45] Date of Patent: Aug. 14, 1984

[54] LOCKING MECHANISM FOR INDEXING DEVICE

[75] Inventor: Carl W. Lindemeyer, Aurora, Ill.

[73] Assignee: The United States of America as represented by the Department of Energy, Washington, D.C.

[21] Appl. No.: 342,443

[22] Filed: Jan. 25, 1982

[51] Int. Cl.³ .................... F16H 57/10; B23B 29/24; B23Q 17/00; F16B 2/02

[52] U.S. Cl. ................... 74/411.5; 74/813 L; 403/350

[58] Field of Search .............. 74/411.5, 813 L, 530, 74/526; 70/190, 245, 246, 247, 249; 403/DIG. 7, 408, 409, 350

[56] References Cited

U.S. PATENT DOCUMENTS

| | | | |
|---|---|---|---|
| 292,297 | 2/1884 | Lipe | 74/396 |
| 649,831 | 5/1900 | Fuller | 403/DIG. 7 |
| 1,526,207 | 2/1925 | Dumas | 70/190 |
| 1,564,220 | 12/1925 | Dumas | 70/190 |
| 1,963,332 | 6/1934 | Morgan, Jr. et al. | 74/411.5 |
| 1,969,035 | 8/1934 | Rice et al. | 74/411.5 |
| 2,252,618 | 8/1941 | Campbell | 74/411.5 |
| 2,335,606 | 11/1943 | Pelphrey | 74/396 |
| 2,746,673 | 5/1956 | Collins | 74/411.5 |
| 2,868,271 | 1/1959 | Pickles | 248/429 |
| 3,126,985 | 3/1964 | Selset | 188/82.7 |
| 3,516,303 | 6/1970 | Imgrunp | 74/527 |
| 3,540,312 | 11/1970 | Russ | 74/813 |
| 3,618,427 | 11/1971 | Schoepe | 74/824 |
| 3,633,719 | 1/1972 | Lynch | 70/190 |
| 3,717,044 | 2/1973 | Bassoff | 74/142 |
| 4,315,585 | 2/1982 | Seitz | 403/350 |

FOREIGN PATENT DOCUMENTS 52-27954 3/1977 Japan .................. 74/411.5

Primary Examiner—Lawrence J. Staab
Assistant Examiner—Michael D. Bednarek
Attorney, Agent, or Firm—Bruce R. Mansfield; Paul A. Gottlieb; Michael F. Esposito

[57] ABSTRACT

Disclosed is a locking mechanism for an indexing spindle. A conventional spur gear having outwardly extending teeth is affixed to the spindle. Also included is a rotatably mounted camshaft whose axis is arranged in skewed relationship with the axis of the spindle. A disk-like wedge having opposing camming surfaces is eccentrically mounted on the camshaft. As the camshaft is rotated, the camming surfaces of the disc-like member are interposed between adjacent gear teeth with a wiping action that wedges the disc-like member between the gear teeth. A zero backlash engagement between disc-like member and gear results, with the engagement having a high mechanical advantage so as to effectively lock the spindle against bidirectional rotation.

5 Claims, 4 Drawing Figures

LOCKING MECHANISM FOR INDEXING DEVICE

CONTRACTUAL ORIGIN OF THE INVENTION

The United States Government has rights in this invention pursuant to Contract No. EY-76-C-02-3000 between the U.S. Department of Energy and the Fermi National Accelerator Laboratory.

BACKGROUND OF THE INVENTION

This invention is primarily concerned with mechanisms which repeatedly lock a spindle in a variety of angular positions. Various locking devices have been proposed in the past. Most well known locking devices utilize either a pawl which engages a notched disk or a tapered pin which engages a precision aperture located in the face of a disk. Such arrangements have limited mechanical advantage and are adversely affected by dirt or the like contamination of engaging surfaces. While higher mechanical advantages are provided by toggle linkages or crank arrangements, these mechanisms require clearances which are not always available for a given machine design. Most of these prior art arrangements have some amount of backlash, which is objectionable when high precision alignment is required. Further, many of these arrangements provide a uni-directional locking which is capable of resisting spindle movement in only one given rotational direction.

It is therefore an object of the present invention to provide a locking mechanism having a very high mechanical advantage which provides truly zero backlash securement.

It is another object of the present invention to provide a locking mechanism of the above-described type which is capable of bi-directional locking, resisting torques which have both a clockwise and a counterclockwise sense.

It is also an object of the present invention to provide a compact locking mechanism mounted on a shaft whose axis is arranged in non-parallel, non-intersecting arrangement with the longitudinal axis of the spindle to be locked.

A further object of the present invention is to provide a low cost locking mechanism compatible for use with conventional gears or the like indexing arrangements.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

These and other objects of the present invention are provided by a locking mechanism comprising a conventional gear or the like indexing means mounted on a spindle which is to be locked at a precise angular position. A disk-like member having camming surfaces for engagement between adjacent teeth of the gear is mounted for rotation on a cam shaft which is arranged in non-parallel, non-intersecting relationship with the spindle axis. The disk is mounted with an eccentric-like mounting such that its rotational displacement causes contact points with the gear teeth to advance to inner radial positions of the disk which have an increased thickness. Upon rotation of the camshaft, the disk is wedged between adjacent gear teeth with a wiping action to provide a truly zero backlash locking of the spindle.

DETAILED DESCRIPTION OF THE PREFERRED EMBDDIMENT

Figure 1:
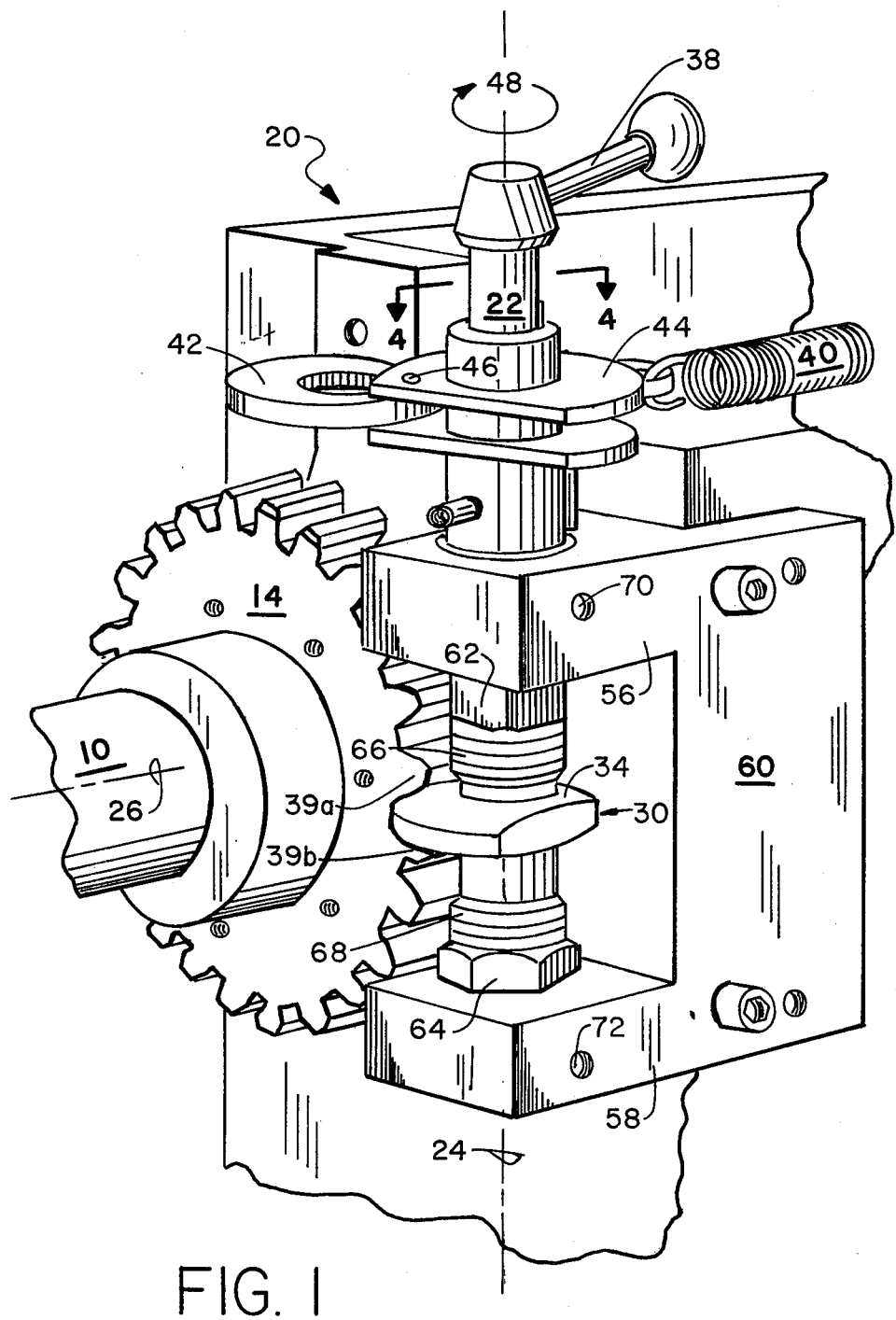
FIG. 1 is a perspective view of a locking mechanism according to the invention, shown installed on a machine.

Referring now to the drawings and especially to FIG. 1, spindle 10 (part of a machine not shown in the drawings) is to be locked in a prescribed rotational position. Gear 14, part of the clamping arrangement of the invention, is affixed to spindle 10 using suitable techniques. Gear 14 was chosen to be a readily available gear of the involute spur type, but any gear-like member having accurately positioned teeth could be used. The numeral 20 refers to the remainder of the clamping mechanism, which is mounted for rotation about a shaft 22. The axis 24 of shaft 22 is arranged in a skewed, or non-intersecting, non-parallel relationship with the longitudinal axis 26 of spindle 10. More particularly, in the preferred embodiment, axis 24 lies in the plane of gear 14 which plane is perpendicular to the axis 26 of spindle 10. This relative alignment between axes 24,26 affords a compact installation and distinguishes the type of clamping arrangement of the invention from the most common types of prior art clamping arrangements.

Mechanism 20 comprises a disk-like member 30 which is with an eccentric-like mounting. More specifically, the term "eccentric-like mounting" as used herein is intended to extend the concept of an eccentric mounting to wedging members that are either not circular or do not comprise complete circles, in their peripheral shape. The term "eccentric-like mounting" is therefore used to describe a wedging member which is mounted for rotational displacement about a rotation point, wherein distances from the outer periphery of the member to the rotation point vary with angular displacement of the member on shaft 22. disc-like member 30, shown in greater detail in FIG. 2, has opposed camming surfaces 34,36 located adjacent outer peripheral portions of the disk-like member. The radially outer ends of camming surfaces 34, 36 are inclined toward each other. As shaft 22 is rotated by a handle 38 for example, disc-like member 30 is rotationally advanced between adjacent teeth 39a,39b of gear 14 such that camming surfaces 34,36 of disk 30 engage opposing surfaces of those teeth. Since disc-like member 30 is eccentrically mounted on shaft 22 with an eccentric-like mounting, further rotation of handle 38 causes the point of contact between gear teeth and camming surfaces to advance from the outer periphery of disc-like member 30 to radially inner portions of that disk. Gear teeth 39a, 39b initially contact radially outer portions of disc-like member 30 but as shaft 22 is rotated, radially inner portions of disc-like member 30 are engaged with a wiping action which wedges the disc-like member between adjacent teeth of gear 14. This provides a positive locking of spindle 10 with a truly zero backlash. Further, the arrangement according to the invention maintains zero backlash locking by automatically adjusting for wear in the disc-like member or gear teeth. The wiping action between cam surfaces and gear teeth precludes malfunction in contaminated environments.

A spring 40 is attached to shaft 22 to provide a rotational bias force which maintains engagement between disc-like member 30 and gear 14. The attachment of spring 40 may take any suitable form, but was preferably an overcenter arrangement since it was desirable to lock the disk-like member securely into and out of engagement with gear 14. Spring 40 is attached to crank arm 42 which in turn is pinned to collar 44 by a pin 46. Collar 44 is securely affixed to shaft 22, such that the spring force is directly applied to disk 30 as shaft 22 is rotated in the direction of arrow 48. As cam shaft 22 is operated, collar 44 is rotated so as to bring crank 42 to an an over-toggle position just before wedging of disk-like member 30 is completed. Spring 40 thereafter maintains wedging engagement of disc-like member 30 and gear 14 with a large mechanical advantage which, when coupled with the friction between disk 30 and a gear tooth 14, resists any disengaging force. This in turn requires only a light actuating force on handle 38 to lock spindle 10.

Figure 2:
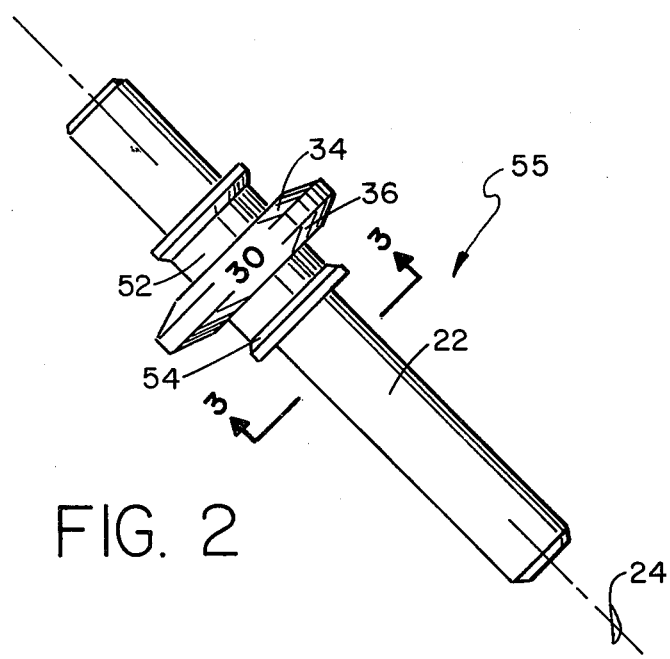
FIG. 2 is a plan view of the cam shaft portion of the locking mechanism of FIG. 1.
Figure 3:
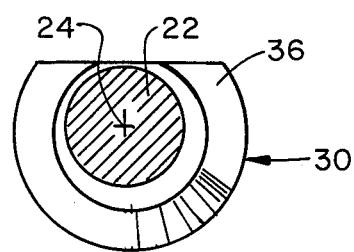
FIG. 3 is a cross-sectional view taken along the lines 3—3 of FIG. 2.
Figure 4:
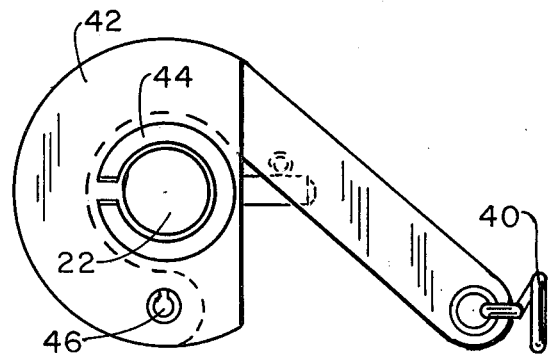
FIG. 4 is a cross-sectional view taken along the lines 4—4 of FIG. 1.

In the preferred embodiment, disc-like member 30 was integrally formed with shoulder portions 52,54 and shaft 22 to comprise a subassembly 55, as shown in FIG. 2. Mounting of subassembly 55 is accomplished by inserting the ends of shaft 22 in the legs 56,58 of bracket 60. Conventional bushings 62,64 and thrust bearings 66,68 complete the rotational mounting of shaft 22 and disk 30. In the preferred embodiment, bushings 62,64 are threadingly engaged with bracket 60 so as to provide slight vertical alignment of disc-like member 30, as may be required. This feature reduces the accuracy required to machine bracket 60. After adjustment, bushings 62,64 are locked in place by set screws 70,72.

In an other embodiment of the invention, disc-like member 30 is replaced by a circular disc-like member whose outer peripheral portions have a tapered thickness. This disc-like member need not be eccentrically mounted on camshaft 22, since rotation of the camshaft advances thicker peripheral portions between the gear teeth. All other features of this embodiment are identical to those heretofore described, except that the gear teeth are preferably crowned or bowed-out at their central portions. If the disc-like member is concentrically mounted on camshaft 22, the radially directed (relative to the disc) force component of the first embodiment will not be realized. This component, resulting from the eccentric-like mounting of disc-like member 30, lies in the plane of the gear and effects end-wise insertion of the disc-like member between gear teeth. Therefore, the arrangement of the second embodiment would be employed where the combined wiping actions, directed tangentially and radially with respect to disc-like member 30, are not required. In the second embodiment, the sole wiping action is tangential to disc-like member 30. Since the centers of conventional gear teeth have the greatest strength, the wiping action between disc-like member and gear should occur there. Therefore, the teeth of the second embodiment are crowned, a feature not required in the first embodiment owing to the configuration and mounting of disk 30.

In the first and second embodiments of the invention, the camshaft lies in the plane of the gear, i.e. is parallel to the gear faces. However, it will be apparent to those skilled in the art, that the camshaft can be inclined relative to the gear plane if the disc-like member is correspondingly inclined relative to the camshaft axis.

It can be seen that the clamping arrangement according to the invention provides bi-directional locking of spindle 10, which resists both clockwise and counter-clockwise torques which are applied to spindle 10.

The embodiments of the invention in which an exclusive property or privilege is claimed are defined as follows:

1. A locking arrangement that prevents rotation of an elongated spindle comprising:
   gear means mounted on said spindle, said gear means having a plurality of predeterminedly spaced-apart teeth with portions of each of said teeth lying in a first plane which is perpendicular to the longitudinal axis of the spindle;
   a rotatably mounted shaft having an axis of rotation which is in skewed relationship with said longitudinal axis of said spindle; and
   wedging means including an outer periphery, a rotation point, and spaced-apart opposing camming surfaces inclined toward convergence at said outer periphery, said wedging means mounted on said shaft for rotational displacement about said rotation point, with distances from said outer periphery to said rotation point varying with angular displacement of said wedging means, such that, as said shaft is rotated, said wedging means is interposed between adjacent teeth of said gear means with a component of movement directed toward said spindle such that said camming surfaces engage said teeth of said gear means with a wiping action so as to be wedged between said teeth to thereby lock said spindle in a zero backlash manner.

2. The arrangement of claim 1 wherein said wedging means comprises a disk-like member, and the outer peripheral portions of said disk-like member are of substantially constant thickness.

3. The arrangement of claim 2 wherein said teeth of said gear means are radially outwardly extending, and are advanced radially inwardly relative to said camming surfaces as said shaft is rotated.

4. The arrangement of claim 3 further including bias means for maintaining the wedging engagement of said disc-like member and said teeth of said gear means.

5. The arrangement of claim 4 wherein the axis of rotation of said shaft lies in said first plane.

* * * * *